(12) United States Patent
Brunner et al.

(10) Patent No.: US 9,329,341 B2
(45) Date of Patent: May 3, 2016

(54) RADIATION SCRIBED WAVEGUIDE COUPLING FOR PHOTONIC CIRCUITS

(75) Inventors: Robert Brunner, Montreal (CA); Qing Xu, Montreal (CA); Stephane Lessard, Mirabel (CA)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 426 days.

(21) Appl. No.: 13/591,359

(22) Filed: Aug. 22, 2012

(65) Prior Publication Data

US 2014/0056554 A1 Feb. 27, 2014

(51) Int. Cl.
*G02B 6/13* (2006.01)
*G02B 6/122* (2006.01)

(52) U.S. Cl.
CPC ............... *G02B 6/13* (2013.01); *G02B 6/1221* (2013.01)

(58) Field of Classification Search
CPC ................................. G02B 6/13; G02B 6/1221
USPC ........................................ 385/14; 65/378, 485
See application file for complete search history.

(56) References Cited

U.S. PATENT DOCUMENTS

| | | | |
|---|---|---|---|
| 6,192,712 B1* | 2/2001 | Saito et al. | 65/386 |
| 6,432,278 B2* | 8/2002 | Sugioka et al. | 204/157.15 |
| 6,516,114 B2* | 2/2003 | Zhao | G02B 6/12007 385/15 |
| 6,573,026 B1 | 6/2003 | Aitken et al. | |
| 6,950,591 B2* | 9/2005 | Schroeder et al. | 385/132 |
| 7,132,223 B2* | 11/2006 | Schroeder et al. | 430/321 |
| 8,270,788 B2* | 9/2012 | Herman et al. | 385/37 |
| 2002/0076655 A1* | 6/2002 | Borrelli | B23K 26/0635 430/321 |
| 2002/0181048 A1* | 12/2002 | Kuykendall et al. | 359/130 |
| 2003/0003737 A1* | 1/2003 | Delwala | 438/689 |
| 2003/0035640 A1* | 2/2003 | Dugan et al. | 385/124 |
| 2003/0215204 A1* | 11/2003 | Schroeder et al. | 385/132 |
| 2004/0081384 A1* | 4/2004 | Datesman | G01N 33/54373 385/12 |
| 2004/0258359 A1* | 12/2004 | Corkum et al. | 385/39 |

(Continued)

FOREIGN PATENT DOCUMENTS

| | | |
|---|---|---|
| JP | H05164927 A | 6/1993 |
| WO | 2008025076 A1 | 6/2008 |

OTHER PUBLICATIONS

Edward Palen, "Optical coupling to monolithic integrated photonic circuits." Proc. of SPIE, vol. 6478. 2007. pp. 64780K-1 through 64780K-6.

(Continued)

*Primary Examiner* — Peter Radkowski
(74) *Attorney, Agent, or Firm* — Murphy, Bilak & Homiller, PLLC (57) ABSTRACT

Optical waveguide coupling ratios can be modified for a package by providing a substrate with a photonic circuit disposed on a first section of the substrate and a plurality of optical waveguides formed in glass disposed on a second section of the substrate, the waveguides being connected to the photonic circuit, adjacent ones of the waveguides having a fixed coupling ratio. A three-dimensional region of the glass abutting an end of one or more of the waveguides is lased to change a refractive index of the glass in each three-dimensional region, and thereby extend a length of each waveguide abutting one of the three-dimensional regions so that the coupling ratio between that waveguide and an adjacent waveguide is changed as a function of the extended length. The lasing is controlled based on feedback so that each coupling ratio changed by the lasing varies by less than a target amount.

11 Claims, 9 Drawing Sheets

(56) References Cited

U.S. PATENT DOCUMENTS

2005/0141840 A1* 6/2005 Schroeder et al. ............ 385/129
2005/0244123 A1  11/2005 Hirao et al.
2009/0067775 A1*  3/2009 Sanders ......................... 385/12
2009/0304331 A1  12/2009 Herman et al.
2011/0128257 A1*  6/2011 Kim .............................. 345/175
2012/0044212 A1*  2/2012 Mizutani ....................... 345/175

OTHER PUBLICATIONS

Yusuke Nasu and Masaki Kohoto, "Waveguide interconnection enables configurable lightwave circuits." SPIE Newsroom, 10.1117/2.1200605.0225. The Internatiional Society for Optical Engineering, 2006. pp. 1-3.

Christopher Richard Doerr and Katsunari Okamoto, "Advances in Silica Planar Lightwave Circuits." Journal of Lightwave Technology, vol. 24, No. 12. Dec. 2006. IEEE.

\* cited by examiner

RADIATION SCRIBED WAVEGUIDE COUPLING FOR PHOTONIC CIRCUITS

TECHNICAL FIELD

The present invention generally relates to photonic circuits, and more particularly relates to waveguide coupling for photonic circuits.

BACKGROUND

To accommodate optically enabled MCM (multi-chip module) packages having high port counts, it is anticipated that external laser light sources will be the norm in order to alleviate thermal concerns. In CMOS (complementary metal oxide semiconductor) photonic circuits, an external source lased light is injected vertically by positioning an optical fiber at a slight angle into a PGC (polarization grating coupler), which has the effect of separating the source laser light into its TE (transverse electric) and TM (transverse magnetic) components. The PGC also rotates the TM component into a TE polarization which easily propagates through a silicon substrate in the lateral direction. Depending on the number of optical channels being driven by a single laser light source, a single CW (continuous wave) light source can be split into N "equal" intensities to be fed into N distinct MZI (Mach-Zehnder interferometer) modulators, effecting N egress optical data channels.

When building an MCM package or CSP-OE (chip scale package-optical engine) package, it is typically assumed that all optical egress channels require identical link budgets. But in a practical system this may not be the case, and some channels sourced by the same laser may need to drive extremely short/long or lossless/high-loss links simultaneously. Utilizing in-line SOAs (semiconductor optical amplifiers) or dedicated LD/VOAs (laser diode/variable optical attenuator) per channel with feedback circuitry is a costly system solution, especially for devices supporting a large channel count.

Conventional passive optical splitters integrated onto a silicon die or PLC (planar light wave circuit) cannot be altered, or reconfigured after the fabrication process of the circuit. Conventional hybrid polymer waveguide circuits, which are less costly to fabricate, are not thermally stable to integrate into an MCM package due to the high junction temperatures of semi-conductor electronics. Fabrication of custom dies having tailored optical splitter ratios (e.g. 99/1, 90/10, 80/20, etc.) rarely achieve their designed coupling ratios from one die to the next due to across wafer process variations, and small batch fabrication is an extremely expensive approach to achieve optical power management for each egress optical channel.

SUMMARY

Embodiments described herein utilize the full optical power capacity of a single source laser and distribute the light on-die on a per channel basis, tuning the light distribution on each egress optical channel of a waveguide using a post-fabrication radiation scribed waveguide coupling process. With radiation scribed waveguide coupling, a coupler can be fabricated which satisfies the most typical optical splitter coupling ratio e.g. 50/50. An optical splitter coupling ratio of 50/50 results in an even distribution of light to all egress light channels in an optically enabled MCM or standalone CSP-OE, such as a mini-MCM. Such predefined splitter coupling ratios can be calibrated or trimmed post-fabrication using a high energy laser to scribe three-dimensional patterns into the waveguide glass, effectively changing the coupling ratio as desired by extending the length of one or more waveguides. A mass produced N-channel CSP-OE fabricated with a default (fixed) even light channel distribution of 1/N intensity per channel can thus be modified post-fabrication to the desired intensities per channel using the radiation scribed waveguide coupling process.

According to an embodiment of a method of modifying optical waveguide coupling ratios, the method comprises: providing a substrate with a photonic circuit disposed on a first section of the substrate and a plurality of optical waveguides formed in glass disposed on a second section of the substrate, the waveguides being connected to the photonic circuit, adjacent ones of the waveguides having a fixed coupling ratio; lasing a three-dimensional region of the glass abutting an end of one or more of the waveguides to change a refractive index of the glass in each three-dimensional region and thereby extending a length of each waveguide abutting one of the three-dimensional regions so that the coupling ratio between that waveguide and an adjacent waveguide is changed as a function of the extended length; and controlling the lasing based on feedback, so that each coupling ratio changed by the lasing varies by less than a target amount.

According to an embodiment of a package, the package comprises a substrate, a photonic circuit disposed on a first section of the substrate, and a plurality of optical waveguides formed in glass disposed on a second section of the substrate, the waveguides being connected to the photonic circuit, adjacent ones of the waveguides having a coupling ratio. One or more layers which can block laser light are disposed on the first section of the substrate, but not on the glass in the second section, so that a window is provided through the one or more layers to the glass for laser light. The coupling ratio for at least some of the adjacent waveguides varies by +/−0.1% or less, and at least some of the adjacent waveguides have different coupling ratios so that some of the waveguides are operable to carry light at a lower intensity and other ones of the waveguides are operable to carry light at a higher intensity.

According to an embodiment of an apparatus, the apparatus comprises a base operable to receive a substrate with a photonic circuit disposed on a first section of the substrate and a plurality of optical waveguides formed in glass disposed on a second section of the substrate, the waveguides being connected to the photonic circuit, adjacent ones of the waveguides having a fixed coupling ratio, the glass being part of the substrate or a material formed on the substrate. The apparatus further includes a laser operable to lase a three-dimensional region of the glass abutting an end of one or more of the waveguides to change a refractive index of the glass in each three-dimensional region, and thereby extending a length of each waveguide abutting one of the three-dimensional regions so that the coupling ratio between that waveguide and an adjacent waveguide is changed as a function of the extended length. The apparatus also includes a controller operable to control the laser based on feedback so that each coupling ratio changed by the lasing varies by less than a target amount.

Those skilled in the art will recognize additional features and advantages upon reading the following detailed description, and upon viewing the accompanying drawings.

BRIEF DESCRIPTION OF THE DRAWINGS

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Figure 1:
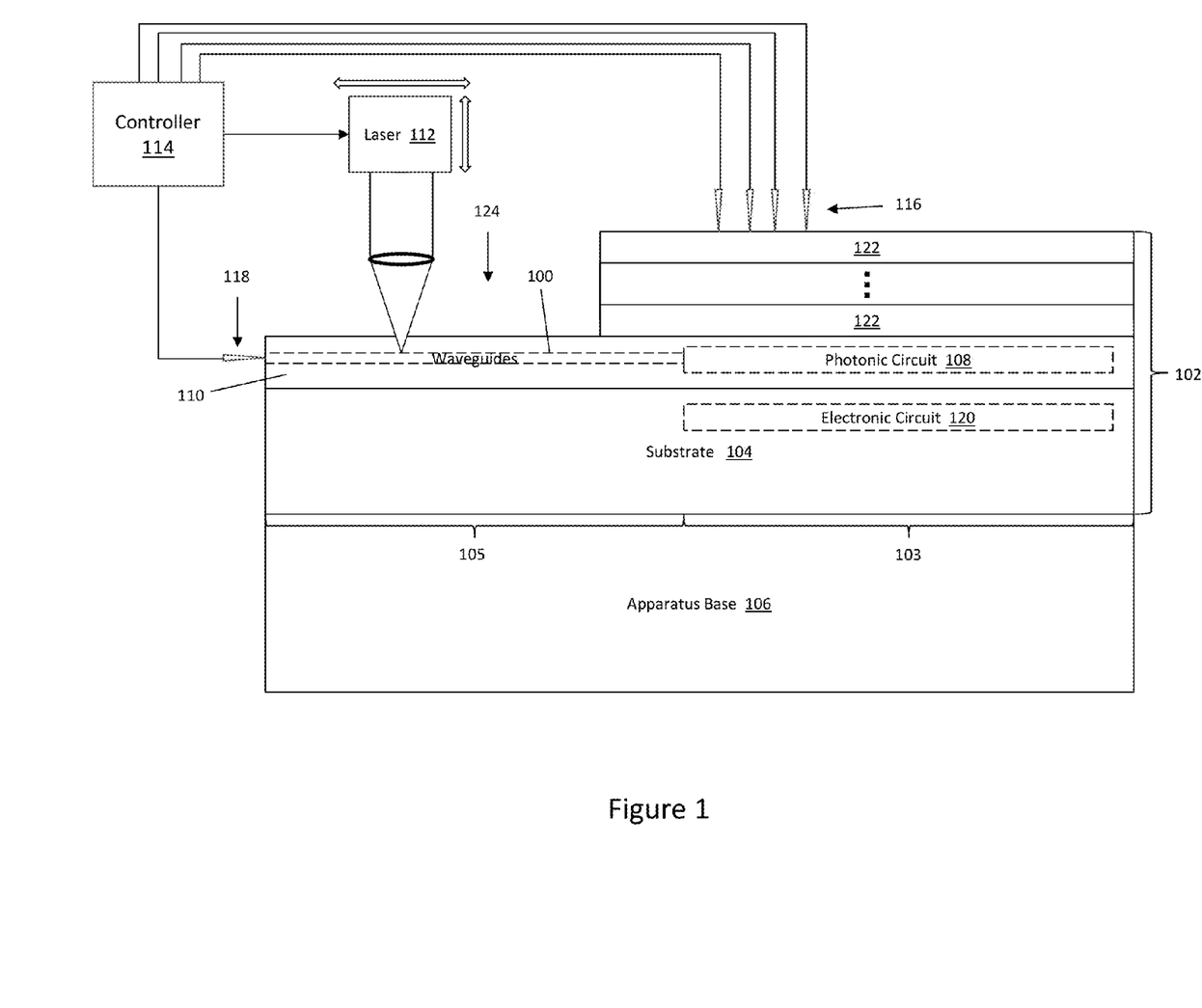
FIG. 1 is a block diagram of an embodiment of an apparatus for tuning the light distribution on optical channels of a waveguide after fabrication of the waveguide.

As a non-limiting example, FIG. 1 illustrates an embodiment of an apparatus for tuning the light distribution on optical channels implemented by waveguides 100 post-fabrication of the chip that includes the waveguides 100. The post-fabrication tuning of the light distribution on the optical channels is performed by the apparatus using radiation scribed waveguide coupling.

In more detail, the optical waveguides 100 are included in a package 102 which has a substrate 104. In one embodiment, the substrate 104 is a semiconductor substrate such as a Si (silicon) or a SOI (silicon-on-insulator) substrate. The substrate 104 is received by a base 106 of the apparatus. A photonic circuit 108 is disposed on a first section 103 of the substrate 104, and the optical waveguides 100 are formed in glass 110 disposed on a second section 105 of the substrate 104. The waveguides 100 are connected to the photonic circuit 108 at one end. Adjacent ones of the waveguides 100 are pre-fabricated with a fixed coupling ratio such as 50/50. The apparatus can tune the light distribution on each egress optical channel of the waveguides 100 by using a post-fabrication radiation scribed waveguide coupling process.

The post-fabrication radiation scribed waveguide coupling process is implemented by a laser 112 and a controller 114 included in the apparatus. The process involves extending the length of one or more of the waveguides 100 to adjust or tune the coupling ratios between waveguides 100. For example, a typical PLC optical coupler has waveguides 100 with the same cross-section geometries and the same indices of refraction in close proximity of each other. Light entering one of the waveguides propagates through the waveguide, traversing a straight section of waveguide that is coupled by an evanescent electric field to a parallel waveguide which can be spaced apart laterally or vertically from the other waveguide. Depending on the length of this parallel coupled region between the waveguides, varying degrees of optical intensities can be observed at the output ports of the coupler. This fixed coupling ratio can be changed post-fabrication by extending the length of one of the waveguides in the parallel coupled region between the waveguides.

To this end, the laser is operable to lase a three-dimensional (3D) region of the glass 110 abutting an end of one or more of the waveguides 100 to change a refractive index of the glass 110 in each 3D region and thereby extend a length of each waveguide 100 abutting one of the 3D regions. By extending the waveguide length in a coupling region formed with an adjacent waveguide 100, the coupling ratio between those waveguides 100 is changed as a function of the extended waveguide length. The controller 114 of the apparatus controls the laser 112 based on feedback, so that each coupling ratio changed by the lasing process varies by less than a target amount. In one embodiment, the controller 114 uses the feedback to control the laser 112, so that each coupling ratio changed by the lasing process varies by +/−0.1% or less. Other target tolerances can be achieved.

In each case, the controller 114 can control the laser 112 based on a measured light intensity output from one or more of the waveguides 100, so that each coupling ratio changed by the lasing varies by less than the target amount. In one embodiment, the apparatus includes a first set of probes 116 for probing the photonic circuit 108 to activate the photonic circuit 108 and a second set of probes 118 for probing one or more of the waveguides 100 to measure the light intensity output from each probed waveguide 100 responsive to the activated photonic circuit 108. The controller 114 uses the measured light intensity output from each probed waveguide 100 to control the laser 112 so that each coupling ratio changed by the lasing process varies by less than the target amount. The substrate 104 can also have an electronic circuit 120, as well as one or more probes for probing the electronic circuit 120 to activate the electronic circuit 120 as part of the waveguide stimulation/feedback process. For example, the photonic and electronic circuits 108, 120 can be in communication with each other and activated via the first set of probes 116. The corresponding waveguide response is measured via the second set of probes 118, and used as feedback to control the lased waveguide extension processing of the package 102.

The package 102 can also have one or more layers 122 on the substrate 104 above the glass 110. These additional layer(s) 122 can be, e.g., insulating and/or wiring layers. The additional layer(s) 122 tend to block laser light and are disposed on the first section 103 of the substrate 104, but not on the glass 110 in the second section 105 of the substrate 104. This way, a window 124 is provided through the one or more additional layers 122 to the glass 110 over the second section 105 of the substrate 104. Each 3D region of the glass 110 to be lased in order to extend the length of one or more waveguides 100 is positioned under the window 124 so that the lasing is not adversely interfered with (blocked) by the additional layer(s) 122 disposed over the first section 103 of the substrate 104.

As shown in FIG. 1, the glass 110 can be a material formed on the substrate 104. For example, the substrate 104 can comprise Si or SOI and the glass 110 can be a layer of silicon oxide formed on the substrate 104. According to this embodiment, the waveguides 100 and the photonic circuit 108 are disposed in the glass material 110 formed on the substrate 104 and the optional electronic circuit 120 is formed in the substrate 104.

Figure 2:
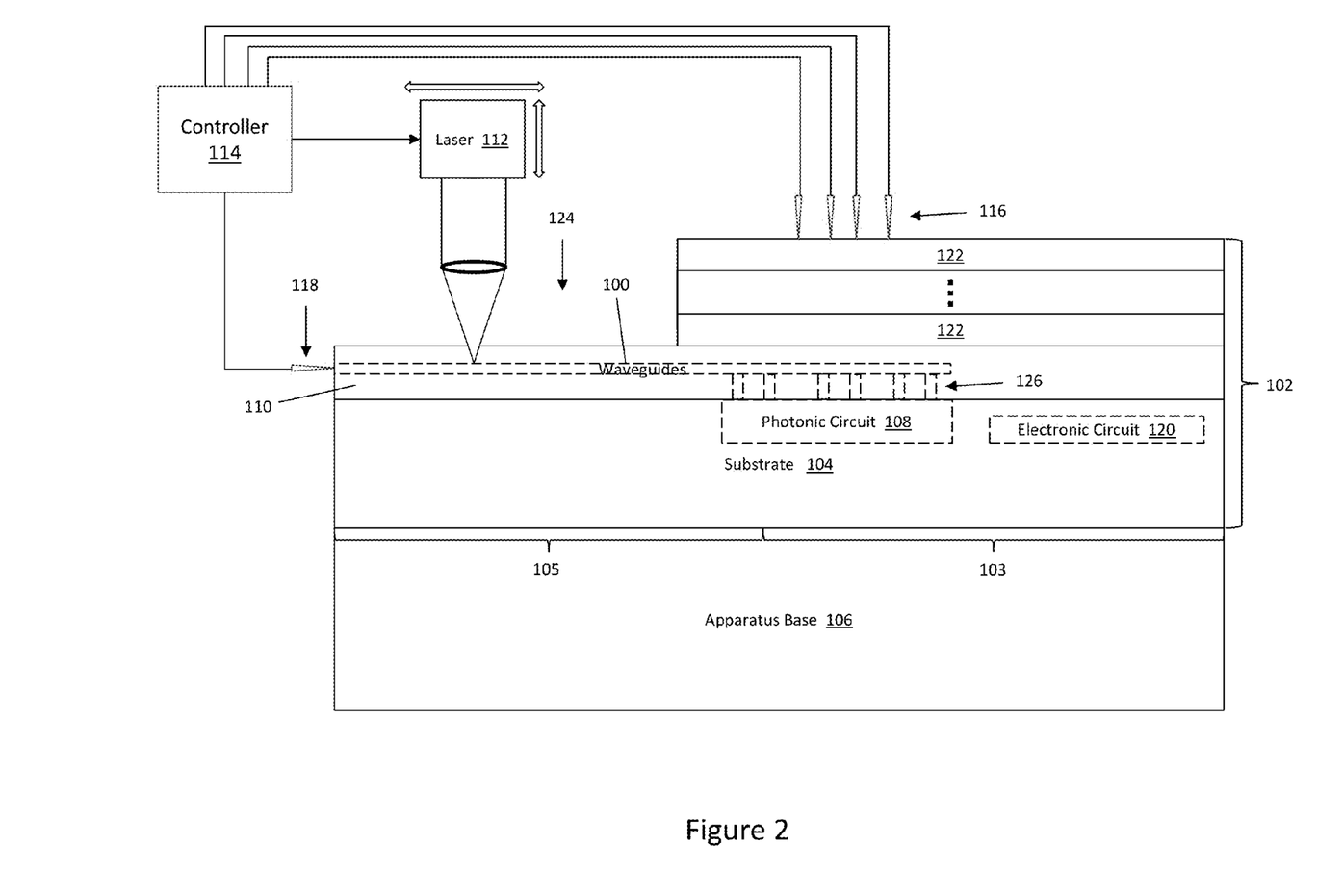
FIG. 2 is a block diagram of another embodiment of an apparatus for tuning the light distribution on optical channels of a waveguide after fabrication of the waveguide.

FIG. 2 shows another embodiment of the apparatus, wherein the waveguides 100 are disposed in a glass material 110 formed on the substrate 104 and the photonic circuit 108 and optional electronic circuit 120 are both fabricated in the substrate 104 below the glass material 110. According to this embodiment, vertical light path connections 126 are provided between the waveguides 100 and the photonic circuit 108 underlying the waveguides 100.

Figure 3:
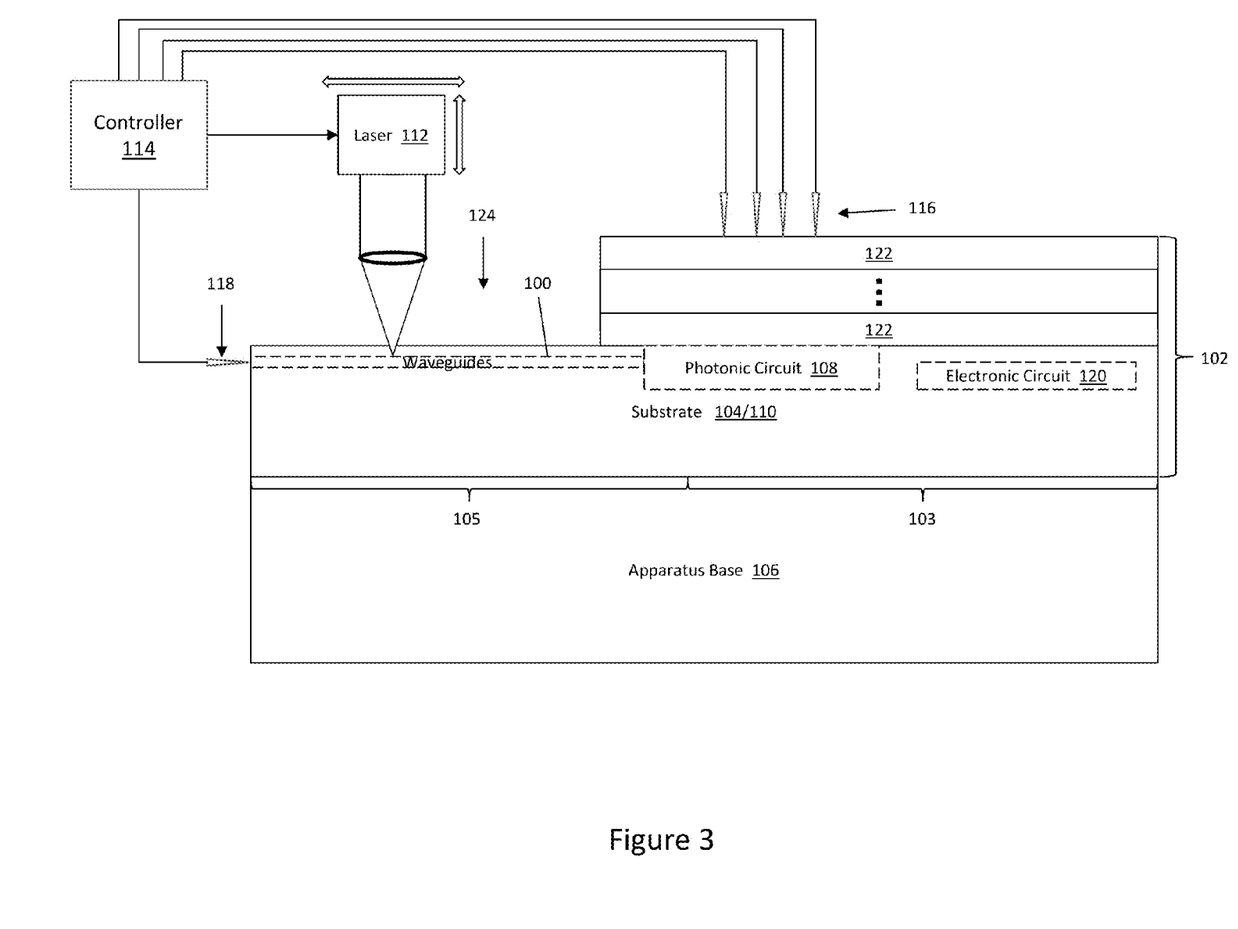
FIG. 3 is a block diagram of yet another embodiment of an apparatus for tuning the light distribution on optical channels of a waveguide after fabrication of the waveguide.

FIG. 3 shows yet another embodiment of the apparatus, where the waveguides 100, the photonic circuit 108 and the optional electronic circuit 120 are each fabricated in the substrate 104. According to this embodiment, the substrate 104 is a semiconductor material such as Si or SOI having doped regions in the second section 105 of the substrate 104 in order to extend the waveguides 100 post-fabrication using the laser scribing process. As such, at least part of the substrate 104 is considered to be glass or glass-like according to this embodiment. The laser source 112 is dependent on the doping material used for the waveguide extension regions. Such regions are discussed in more detail later herein with regard to FIG. 8.

In each of the apparatus embodiments described above, the waveguide coupling ratios can be changed by extending the length of one or more waveguides 100 using the laser 112 and the controller 114. The laser 112 can move in both horizontal and vertical directions as indicated by the respective double arrows shown in FIG. 1-3, to lase 3D regions of the glass 110 abutting the waveguides 100, and thereby extend the length of different ones of the waveguides 100 and tune the waveguide coupling ratios.

Figure 4:
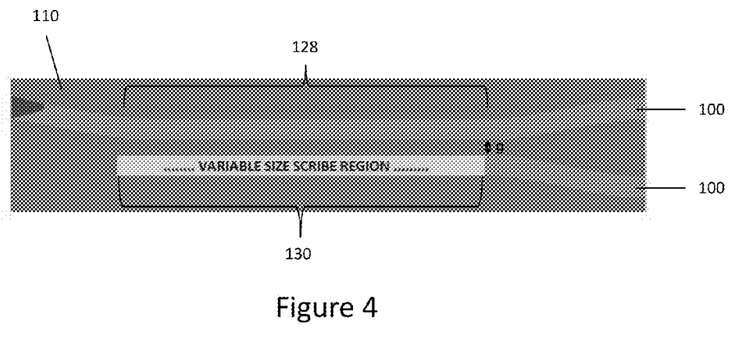
FIG. 4 is a diagram of an embodiment of adjacent waveguides having a coupling region which can be modified post-fabrication of the waveguides.

FIG. 4 shows a top-down plan view of adjacent waveguides 100 included in the package 102. A straight section 128 of the adjacent waveguides 100 forms an optical coupling area as described above, where light traversing one of the waveguides 100 is coupled by an evanescent electric field to the parallel waveguide 100. In the embodiment shown in FIG. 4, the waveguides 100 are spaced apart in the same plane in the glass 110 by a gap 'g'. The apparatus can lase a 3D region 130 (labeled "Variable Size Scribe Region" in FIG. 4) of the glass 110 that extends outward from the end of one of the waveguides 100 (e.g. the lower waveguide in FIG. 4) in the same plane to extend the length of that waveguide 100 in the coupling region, changing the coupling ratio in this region.

In general, the behavior of an optical waveguide coupler can be mathematically expressed based on the coupler length (L) as given by:

$$P_2(L) = P_0 \sin^2\left(\frac{\pi L \Delta n}{\lambda_0}\right) \cdot e^{-gk} \quad (1)$$

and $$L = \frac{\lambda_0}{\pi \Delta n} \sin^{-1}\left(\sqrt{\frac{P_2}{P_0}}\right) \quad (2)$$

where g is the gap distance between the adjacent waveguides 100, $\lambda_0$ is the wavelength of the light beam traversing one of the waveguides 100, k is the coupling constant of the waveguides 100, which depends on geometry and other factors of the waveguides 100, n is the refractive index of the material, $\Delta n$ is the refractive index contrast (change) between the waveguide and cladding area, and $\Delta n = (n^2_{waveguide} - n^2_{cladding})^{1/2}$. Given that the gap 'g' is relatively small in the coupling region, the exponential term in equation (1) reduces to a value of one. The optical output intensity $P_2$ of the second waveguide 100 relative to the input intensity $P_0$ of the first waveguide 100 is expressed by equation (1).

Figure 5:
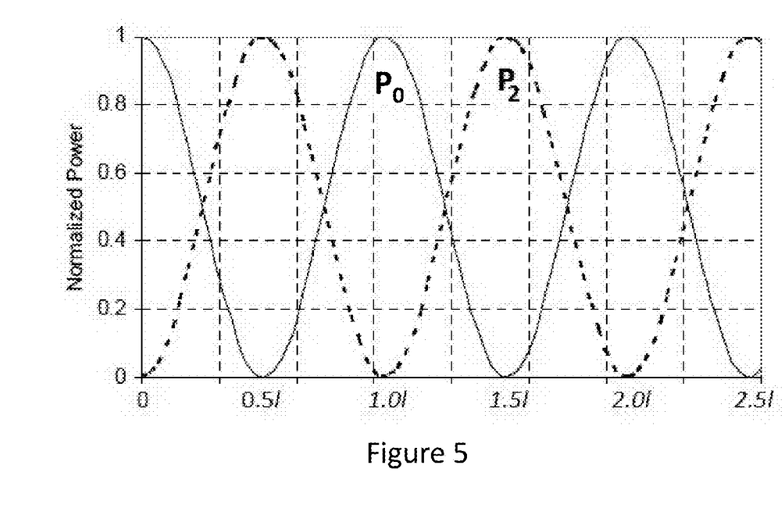
FIG. 5 is a plot diagram illustrating the effect of waveguide length on optical power coupling.

By solving for L in equation (2), the length of the coupler can be expressed as a function of the desired optical couple, i.e. the ratio of $P_2/P_0$. The inverse sine term in equation (2), expressed in terms of radians, results in multiple solutions for the value of L to achieve a desired output power at $P_2$, as shown in the graph FIG. 5.

By injecting light into one waveguide 100 (e.g., the upper waveguide in FIG. 4) and actively monitoring the intensities of the waveguide outputs, a high energy femtosecond pulsed laser 112 can be used to scribe an extended 3D waveguide coupling region 130 to effect a precise coupling ratio. The 3D waveguide coupling region 130 can be allocated as much space as desired to accommodate a number of laser re-scribes. That is, the coupling ratio can be changed more than once after package fabrication.

Figure 6A:
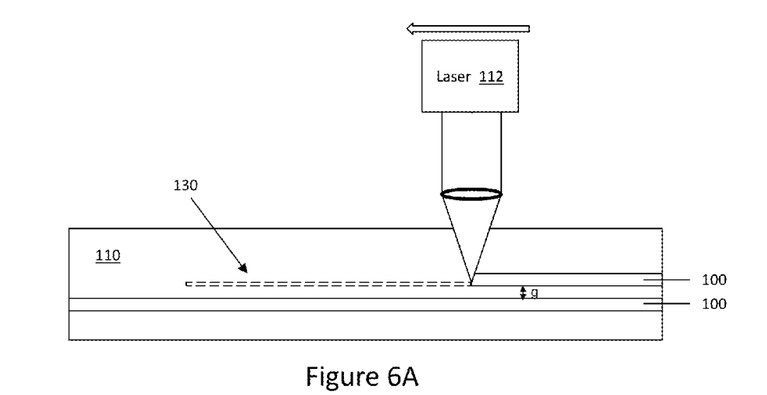
FIGS. 6A and 6B illustrate an embodiment of the post-fabrication radiation scribed waveguide coupling process.
Figure 6B:
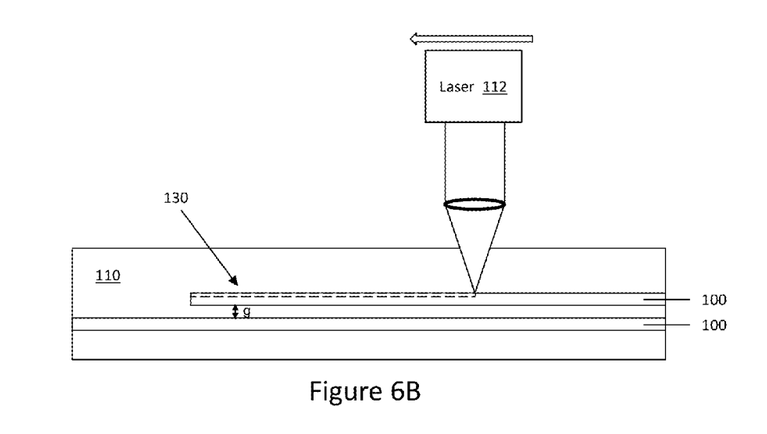

FIGS. 6A and 6B show another embodiment of the package 102 where adjacent (coupled) ones of the waveguides 100 are disposed spaced apart in different planes of the glass 110. As such, the gap (g) between the adjacent waveguides 100 is in the vertical direction and not the horizontal direction as shown in FIG. 4. A 3D region 130 of the glass 110 that extends outward from the end of one of the waveguides 100 (the upper waveguide in FIGS. 6A and 6B) can be lased in the same plane to extend the length of that waveguide 100. FIG. 6A shows the lasing process toward the beginning, where the laser energy and focus are directed toward extending the bottom part of the waveguide 100. The laser 112 passes over the desired length, and the laser energy and/or focus is adjusted to lase the glass material 110 just above the previously lased region. This process is continued as needed until the upper part of the waveguide 100 is extended to the desired length as shown in FIG. 6B. By using 3-D laser scribing, an optical couple can be formed in the vertical plane of the glass 110 as shown in FIG. 6B. The coupling ratio can be tuned very precisely by modifying the length of one waveguide 100 as previously described herein. The lased 3D regions 130 can extend outward from the end of one waveguide 100 in one plane to the other plane. That is, the lased 3D regions 130 can extend both horizontally and vertically in the glass 110 by appropriately adjusting the laser energy and/or focus.

Figure 7:
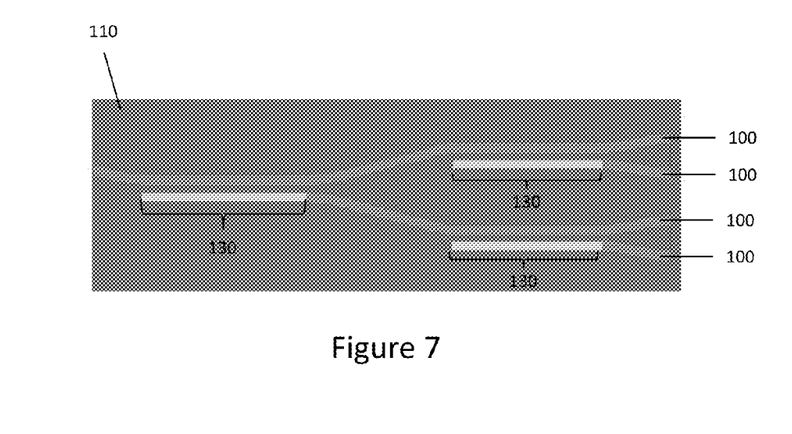
FIG. 7 is a diagram of an embodiment of cascaded tunable couplers having coupling regions which can be modified post-fabrication.
Figure 8:
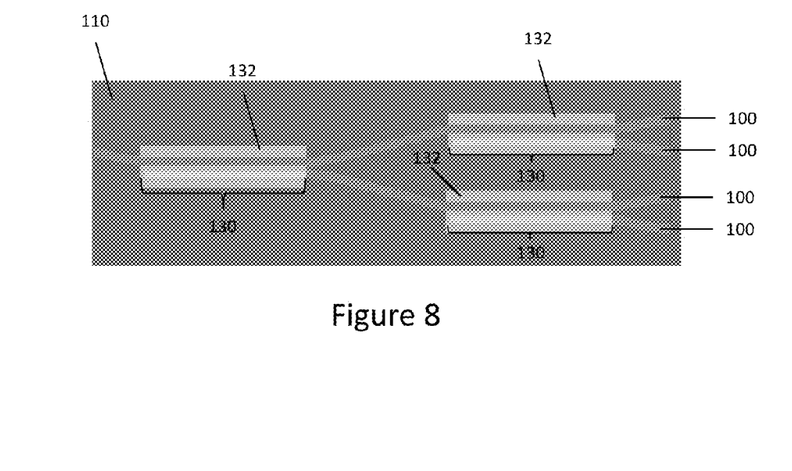
FIG. 8 is a diagram of another embodiment of cascaded tunable couplers having coupling regions which can be modified post-fabrication.

To accommodate a larger port count of optical couplers, several stages of tunable couplers can be cascaded in the package 102 as shown in FIG. 7. The coupling ratios between adjacent ones of the waveguides 100 in each coupling region 130 can be tuned or modified by extending the length of one of the waveguides 100 in each coupling region 130 using laser scribing as previously described herein. The coupling regions 130 may utilize special doping of the substrate 104 to effect a change in the refractive index by radiation scribing, as shown in FIG. 8 which indicates the doped areas 132 provided for enabling extension of the waveguides 100 in the coupling regions 130.

Figure 9:
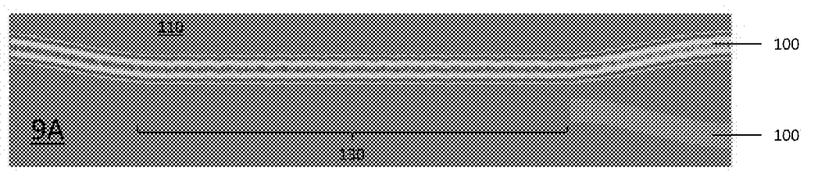
FIGS. 9A through 9D are diagrams of an embodiment of adjacent waveguides with different coupling ratios realized post-fabrication.

FIG. 9 includes FIGS. 9A to 9D which show respective top-down plan views of adjacent waveguides 100 with different coupling ratios. The coupling ratios are different because the length of one waveguide 100 in the coupling region 130 is different in each case. The power coupling between the adjacent waveguides 100 varies from 0% (FIG. 9A) to 50% (FIG. 9D) in this embodiment, and can be changed by extending waveguide length using laser scribing, as previously described herein. The waveguide shadings in FIGS. 9A to 9D represent the different optical coupling ratios.

Figure 10:
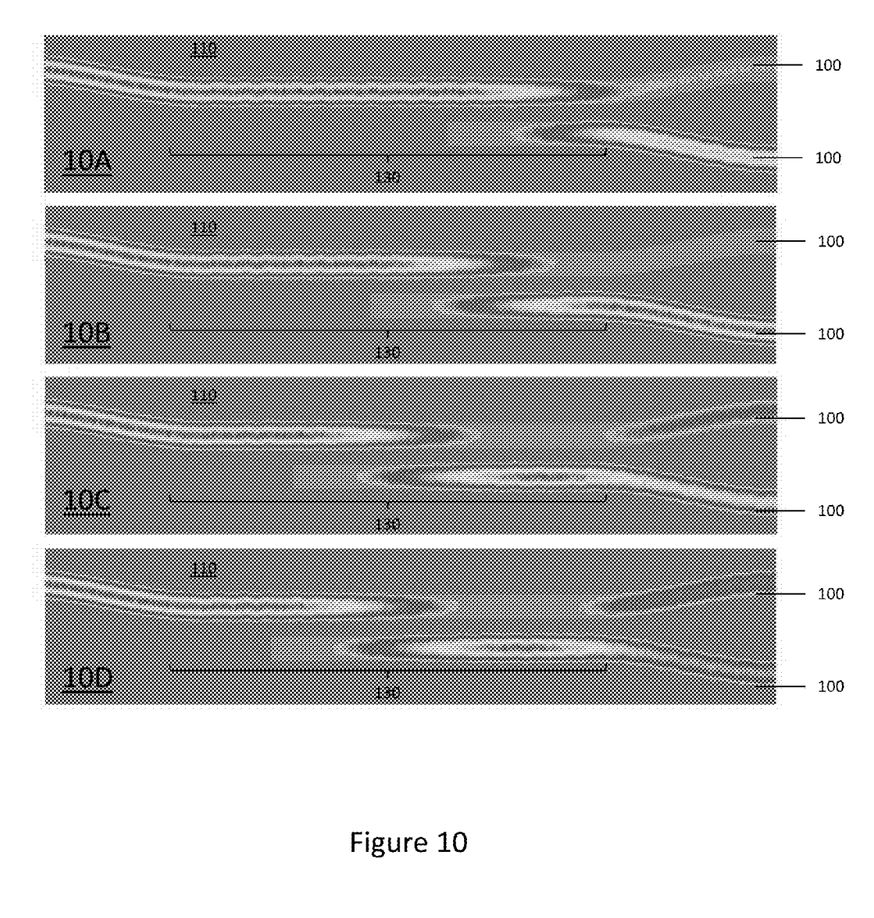
FIGS. 10A through 10D are diagrams of another embodiment of adjacent waveguides with different coupling ratios realized post-fabrication.

FIG. 10 includes FIGS. 10A to 10D, and shows another embodiment of adjacent waveguides 100 with different coupling ratios. FIGS. 10A to 10D show respective top-down plan views of adjacent waveguides 100 where the length of one waveguide 100 in the coupling region 130 is different in each case. FIG. 10A shows an approximately 90% coupling to the lower output port. As the lower waveguide is extended in length by laser 3D scribing, 100% coupling is achieved (FIG. 10B) and then gradually the coupling reverts back to 50% (FIGS. 10C to 10D) as the length is extended even further. The waveguide shadings in FIGS. 10A to 10D represent the different optical coupling ratios.

Figure 11:
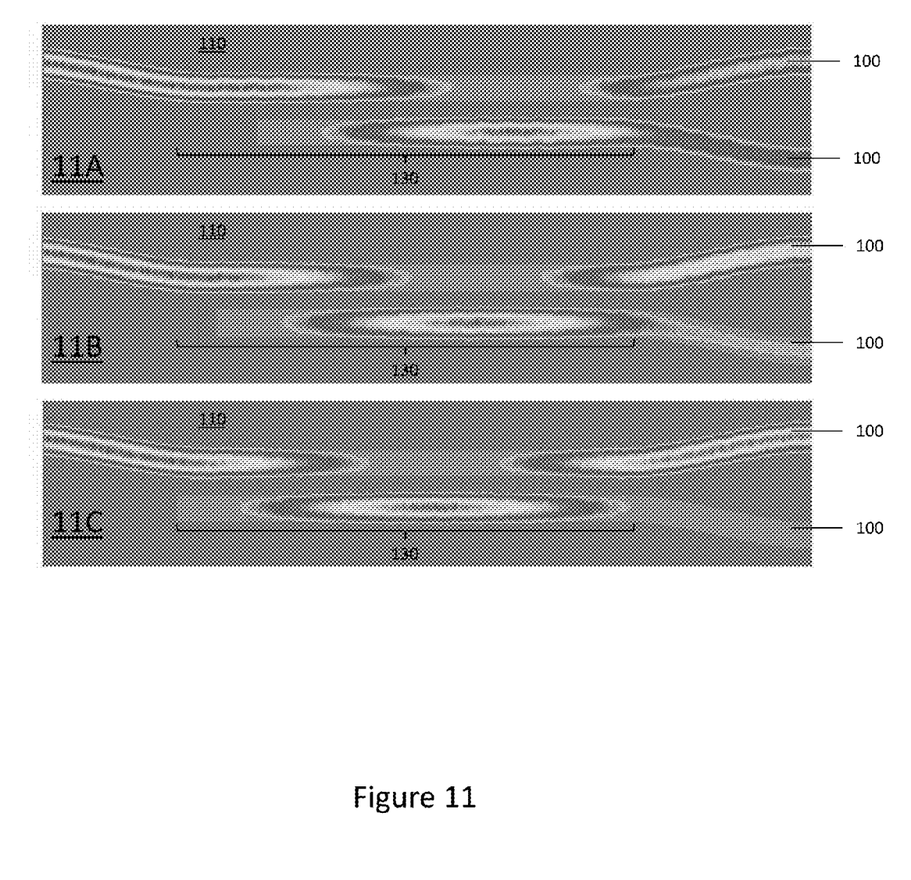
FIGS. 11A through 11C are diagrams of yet another embodiment of adjacent waveguides with different coupling ratios realized post-fabrication.

In FIG. 11, as the lower waveguide 100 is extended in length by 3D laser scribing of the glass material 110 containing the waveguides 100, the coupling ratio is tuned from about 50% (FIG. 11A) to about 0% (FIGS. 11B to 11C) by continuing to extend the length of the lower waveguide 100. The waveguide shadings in FIGS. 11A to 11C represent the different optical coupling ratios.

In another embodiment, a compact form of the waveguides 100 can be produced in a serpentine shape using high-contrast refractive index materials to accommodate light containment at a very small bending radius with low losses. According to this embodiment, the radiation scribed coupling waveguide process assumes a serpentine shape that is overlaid on an upper plane to allow the adjustment of the optical coupling ratio.

The radiation scribed coupling waveguide process described herein can leverage 'economies of scale' of the most generic OE die which have nearly equal intensities on all channels post-fabrication. By applying the radiation scribed coupling waveguide process to a die, the component can be tuned to have near perfect symmetrical/asymmetrical light intensity distributions across all egress optical channels with tight tolerances. The post-production radiation scribed coupling waveguide process eliminates the need for the redesign of an ASIC (application-specific integrated circuit) and numerous IC foundry tape outs when only the optical output distributions need altering in various proportions. The radiation scribed coupling waveguide process can be performed several times, allowing the possibility of a newly designed OE component to be validated in-system and, if required, it can be re-tuned. Dies which are post-processed using the radiation scribed coupling waveguide process are energy efficient for system designs, whereby nearly no optical input power is wasted due to the capability of provisioning a die for its application space, and the optical peripheries are tuned appropriately for remote end connectivity. Such a die also does not require dedicated lasers per channel or VOAs for trimming optical output power. Such a die also does not require in-line amplification using SOAs which provide tuned optical egress power per channel by-design. Such a die improves cooling of MCM packages by eliminating unnecessary active circuitry (e.g. SOAs, VOAs, etc.), and improves system design using banks of laser sourced light by eliminating over-provisioning of LD banks.

Terms such as "first", "second", and the like, are used to describe various elements, regions, sections, etc., and are not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A package, comprising:
   a substrate;
   a photonic circuit disposed on a first section of the substrate;
   a plurality of optical waveguides formed in glass disposed on a second section of the substrate, at least one of the waveguides being connected to the photonic circuit, adjacent ones of the waveguides having a coupling ratio;
   one or more layers which can block laser light disposed on the first section of the substrate but not on the glass in the second section so that a window is provided through the one or more layers to the glass for laser light;
   wherein the coupling ratio for at least some of the adjacent waveguides varies by +/−0.1% or less; and
   wherein at least some of the adjacent waveguides have different coupling ratios so that some of the waveguides are operable to carry light at a lower intensity and other ones of the waveguides are operable to carry light at a higher intensity.

2. The package according to claim 1, wherein the waveguides are disposed spaced apart in a same plane in the glass.

3. The package according to claim 1, wherein adjacent ones of the waveguides are disposed spaced apart in different planes in the glass.

4. The package according to claim 1, wherein the waveguides extend over a first plane in the glass and a second plane in the glass.

5. The package according to claim 1, further comprising an electronic circuit.

6. The package according to claim 1, wherein the glass is part of the substrate.

7. A package, comprising:
   a substrate;
   a photonic circuit disposed on a first section of the substrate;
   a plurality of pre-fabricated optical waveguides formed in glass disposed on a second section of the substrate, at least one of the pre-fabricated waveguides being connected to the photonic circuit, adjacent ones of the pre-fabricated waveguides having a coupling ratio;
   one or more laser light blocking layers disposed on the first section of the substrate but not on the glass in the second section so that a window is provided through each laser light blocking layer to the glass, the window being dimensioned such that a three-dimensional region of the glass abutting one or more of the pre-fabricated waveguides is uncovered by each laser light blocking layer so that a length of each pre-fabricated waveguide abutting the three-dimensional region of glass can be extended by laser light entering the glass through the window.

8. The package according to claim 1, wherein:
   at least a first of said optical waveguides has an ingress at a first side of the glass and an egress at an opposing side of the glass, and is operable to carry light through the glass from the ingress to the egress; and at least a second of said optical waveguides, disposed adjacent to said first optical waveguide, has an egress at the opposing side of the glass but no ingress into the glass.

9. The package according to claim 8, wherein the second optical waveguide includes a section that is parallel to a section of the first optical waveguide, and is disposed such that light traversing the section of the first optical waveguide is coupled by an evanescent electric field to said section of the second optical waveguide.

10. The package according to claim 7, wherein:
at least a first of said pre-fabricated optical waveguides has an ingress at a first side of the glass and an egress at an opposing side of the glass, and is operable to carry light through the glass from the ingress to the egress; and
at least a second of said pre-fabricated optical waveguides, disposed adjacent to said first pre-fabricated optical waveguide, has an egress at the opposing side of the glass but no ingress into the glass.

11. The package according to claim 10, wherein the second pre-fabricated optical waveguide includes a section that is parallel to a section of the first pre-fabricated optical waveguide, and is disposed such that light traversing the section of the first pre-fabricated optical waveguide is coupled by an evanescent electric field to said section of the second pre-fabricated optical waveguide.

* * * * *